US008781669B1

(12) United States Patent
Teller et al.

(10) Patent No.: US 8,781,669 B1
(45) Date of Patent: Jul. 15, 2014

(54) CONSIDERATION OF RISKS IN ACTIVE SENSING FOR AN AUTONOMOUS VEHICLE

(75) Inventors: Eric Teller, San Francisco, CA (US); Peter Lombrozo, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 235 days.

(21) Appl. No.: 13/471,184

(22) Filed: May 14, 2012

(51) Int. Cl.
*G01C 22/00* (2006.01)

(52) U.S. Cl.
USPC .............................. 701/25; 701/301; 700/245

(58) Field of Classification Search
CPC ..................................................... G05D 1/0272
USPC .......... 701/1, 25, 301; 700/245–246, 253, 255
See application file for complete search history.

(56) References Cited

U.S. PATENT DOCUMENTS

| 7,734,387 | B1 | 6/2010 | Young et al. | |
|---|---|---|---|---|
| 2009/0088916 | A1 | 4/2009 | Elgersma et al. | |
| 2009/0174573 | A1* | 7/2009 | Smith | 340/905 |
| 2010/0106356 | A1 | 4/2010 | Trepagnier et al. | |
| 2011/0184605 | A1 | 7/2011 | Neff | |

OTHER PUBLICATIONS

Zhen Jia, Vision Based Target Tracking for Autonomous Land Vehicle Navigation: A Brief Survey, Recent Patents on Computer Science, pp. 32-42, Bentham Science Publishers Ltd, Jan. 2009.

Thanh-Son Dao, Markov-Based Lane Positioning Using Intervehicle Communication, IEEE Transactions on Intelligent Transportation Systems, Dec. 2007, vol. 8, No. 4.

Zhen Jia, Vision Based Target Tracking for Autonomous Land Vehicle Navigation: A Brief Survey, Recent Patents on Computer Science, pp. 32-42, Bentham Science Publishers Ltd, May 14, 2012.

Cem Ünsal, Intelligent Navigation of Autonomous Vehicles in an Automated Highway System: Learning Methods and Interacting Vehicles Approach, Dissertation submitted to the Faculty of the Virginia Polytechnic Institute, Jan. 29, 1997, pp. i-100.

Cem Ünsal, Intelligent Navigation of Autonomous Vehicles in an Automated Highway System: Learning Methods and Interacting Vehicles Approach, Dissertation submitted to the Faculty of the Virginia Polytechnic Institute, Jan. 29, 1997, pp. 101-185.

* cited by examiner

*Primary Examiner* — Thomas Black
*Assistant Examiner* — Luke Huynh
(74) *Attorney, Agent, or Firm* — McDonnell Boehnen Hulbert & Berghoff LLP

(57) ABSTRACT

An autonomous vehicle configured for active sensing may also be configured to weigh expected information gains from active-sensing actions against risk costs associated with the active-sensing actions. An example method involves: (a) receiving information from one or more sensors of an autonomous vehicle, wherein one or more control processes for an autonomous vehicle are based upon the information, (b) determining an information-improvement expectation that corresponds to an active-sensing action, (c) determining a risk-cost that corresponds to the active-sensing action; and (d) based on both (i) the information-improvement expectation for the active-sensing action and (ii) the risk-cost for the active-sensing action, determining whether the active-sensing action is advisable.

31 Claims, 5 Drawing Sheets

CONSIDERATION OF RISKS IN ACTIVE SENSING FOR AN AUTONOMOUS VEHICLE

BACKGROUND

Unless otherwise indicated herein, the materials described in this section are not prior art to the claims in this application and are not admitted to be prior art by inclusion in this section.

Some vehicles are configured to operate in an autonomous mode in which the vehicle navigates through an environment with little or no input from a driver. Such a vehicle typically includes one or more sensors that are configured to sense information about the environment. The vehicle may use the sensed information to navigate through the environment. For example, if the sensors sense that the vehicle is approaching an obstacle, the vehicle may navigate around the obstacle.

SUMMARY

In one aspect, a computer-implemented method involves: (a) receiving information from one or more sensors of an autonomous vehicle, wherein one or more control processes for an autonomous vehicle are based upon the information; (b) determining an information-improvement expectation that corresponds to an active-sensing action, wherein the active-sensing action comprises an action that is performable by the autonomous vehicle to potentially improve the information upon which at least one of the control processes for the autonomous vehicle is based; (c) determining a risk-cost that corresponds to the active-sensing action; and (d) based on both (i) the information-improvement expectation for the active-sensing action and (ii) the risk-cost for the active-sensing action, determining whether the active-sensing action is advisable.

In another aspect, a vehicle system includes one or more sensors and a computer system. The computer system is configured to: (a) use information provided by the one or more sensors for one or more control processes of an autonomous vehicle; (b) determine an information-improvement expectation that corresponds to an active-sensing action, wherein the active-sensing action comprises an action that is performable by the autonomous vehicle to potentially improve the information upon which at least one of the control processes for the autonomous vehicle is based; (c) determine a risk cost that corresponds to the active-sensing action; and (d) based on both (i) the information-improvement expectation for the active-sensing action and (ii) the risk cost for the active-sensing action, determine whether the active-sensing action is advisable.

In yet another aspect, a non-transitory computer-readable medium has program instructions stored thereon that are executable by at least one processor. The program instructions include: (a) instructions for receiving information from one or more sensors of an autonomous vehicle, wherein one or more control processes for the autonomous vehicle are based upon the information; (b) instructions for determining an information-improvement expectation that corresponds to an active-sensing action, wherein the active-sensing action comprises an action that is performable by the autonomous vehicle to potentially improve the information upon which at least one of the control processes for the autonomous vehicle is based; (c) instructions for determining a risk cost that corresponds to the active-sensing action; and (d) instructions for, based on both (i) the information-improvement expectation for the active-sensing action and (ii) the risk cost for the active-sensing action, determining whether the active-sensing action is advisable.

These as well as other aspects, advantages, and alternatives, will become apparent to those of ordinary skill in the art by reading the following detailed description, with reference where appropriate to the accompanying drawings.

DETAILED DESCRIPTION

Figure 1:
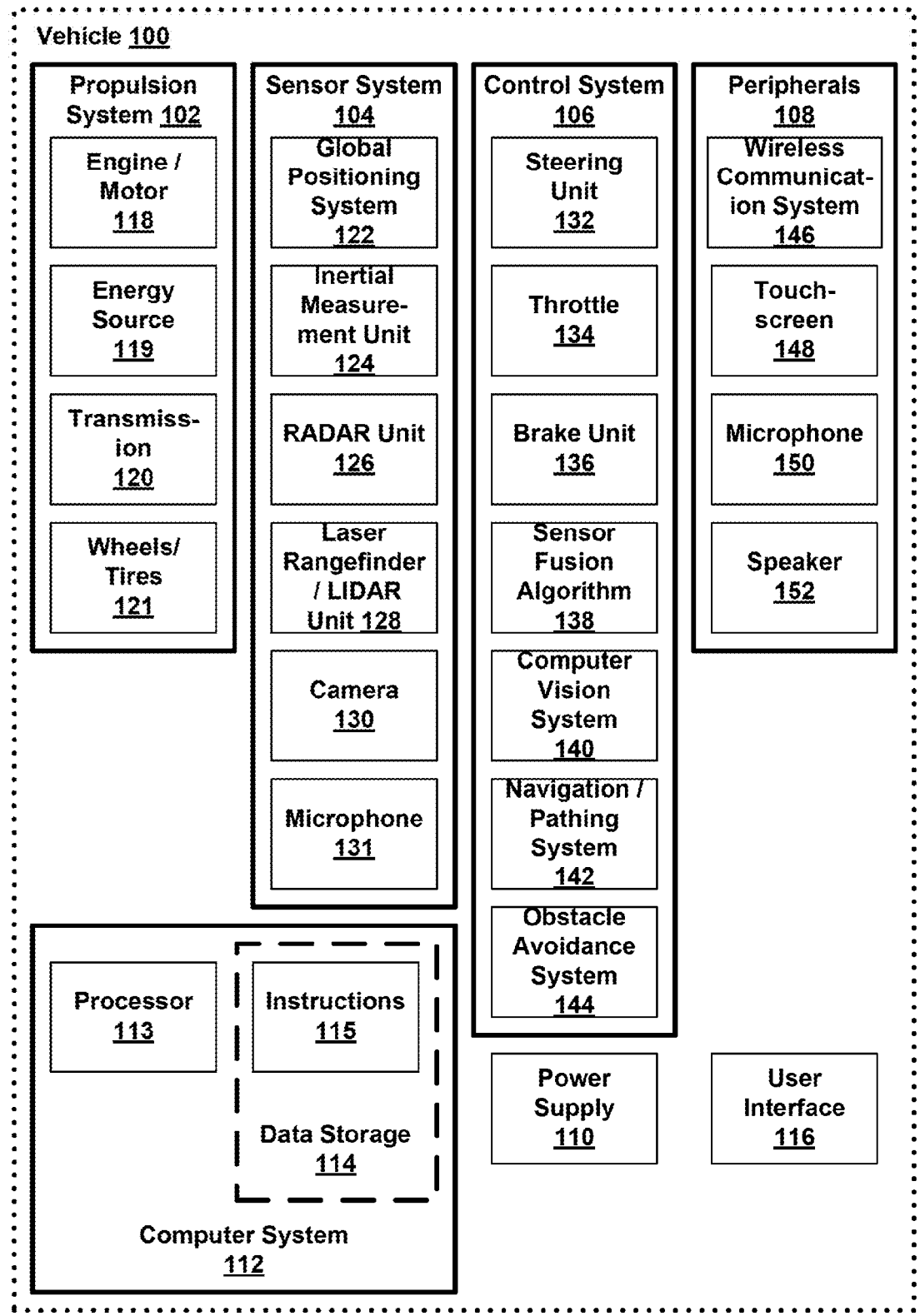
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

Example embodiments may relate to an autonomous vehicle, such as a driverless automobile, that is configured for active sensing. In particular, an autonomous vehicle may include various sensors, which provide information that the autonomous vehicle may use for various control processes. By implementing active-sensing processes, an autonomous vehicle may take proactive actions (referred to herein as "active-sensing actions") in order to improve the information that is provided by or derived from its various sensors, in a manner that is in turn expected to improve at least one of the vehicle's control processes. Thus, active sensing may improve an autonomous vehicle's ability to, e.g., learn about its environment and/or perform self-diagnosis.

However, when an autonomous vehicle takes an active-sensing action, there may be negative consequences. For instance, taking an active-sensing action may increase the vehicle's chance of getting into an accident, make a planned route more difficult, result in loss of information from sensors that might be useful for purposes other than the control process that is being improved, annoy a passenger in the vehicle or a driver of another vehicle, and so on. Accordingly, example embodiments may help an autonomous vehicle consider and weigh both the information that might be gained by taking various active-sensing actions and the negative costs associated with those active-sensing actions, and determine what active-sensing action or action are appropriate to take (if any).

For example, to evaluate a given active-sensing action, an autonomous vehicle may determine an information-improvement value, which quantifies the information it expects to gain in the vehicle state that results from the action. The autonomous vehicle also determines a risk cost associated with the resulting vehicle state, which can be based on the probability of certain negative scenario(s) occurring while in the new vehicle state. Further, in an example embodiment, the information-improvement expectation and the risk cost may be calculated in the same unit of measure, so that a single value may be used to evaluate whether to take an action. As such, the autonomous vehicle can determine a score for the active-sensing action, which takes into account both the information-improvement expectation and the risk cost, and use the score to determine whether the active-sensing action is advisable.

To illustrate, consider a possible active-sensing action where an autonomous vehicle can switch lanes to, e.g., allow its camera(s) or other sensors to obtain more information regarding a traffic light. The autonomous car may determine that it could get a clearer or less ambiguous view of the traffic light by changing lanes, so that it is not blocked by a large SUV, is closer to the light, etc. Based on historical and/or learnt data regarding the potential information gain when such an action is taken, the autonomous car may determine an information-improvement value, which indicates how much information it expects to learn by changing lanes. Further, the autonomous car may determine a risk cost for changing lanes, which may take into account risks such as running off the road, hitting a pedestrian (e.g., 0.1% chance of hitting a pedestrian in the lane closest to the curb versus a 0.07% chance in the lane closest to the middle of the road), having an accident with another car, annoying passenger(s) in the autonomous car and/or other cars resulting by changing lanes, and so on. A combination of the information-improvement expectation and the risk cost may then be used to determine whether or not to switch lanes.

While the example above illustrates the application of an example process to evaluate a single action (i.e., changing from one lane to another), an example process can also help to concurrently analyze multiple active-sensing actions that are possible in a given state of the vehicle. Further, because information-improvement values and/or risk costs for a given action may vary as an autonomous vehicle's environment changes over time, an autonomous vehicle may implement such a process periodically or continually in order to base its decision-making on the current state of its environment and/or its current operating state.

Note that in some embodiments, the risk cost for an action may be determined for the state that is expected to result from an active-sensing action, in isolation. For instance, the risk cost for an action that moves an autonomous vehicle into a certain lane may be calculated based solely on the probabilities of bad events occurring while the autonomous vehicle is in that lane. In other embodiments, the risk cost for an action may be relative, and based on a difference between the risk costs of the resulting state and its current state. For example, the risk cost for changing lanes may be the difference between the risk cost in the lane the autonomous vehicle would be moving into and the risk cost in its current lane.

Some example methods may be carried out in whole or in part by an autonomous vehicle or components thereof. However, some example methods may also be carried out in whole or in part by a system or systems that are remote from an autonomous vehicle. For instance, an example method could be carried out in part or in full by a server system, which receives information from sensors (e.g., raw sensor data and/or information derived therefrom) of an autonomous vehicle. Other examples are also possible.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode, and thus may be referred to as an "autonomous vehicle." For example, a computer system could control the vehicle 100 while in the autonomous mode, and may be operable to receive information from one or more sensors, upon which one or more control processes for an autonomous vehicle are based, to determine an information-improvement expectation that corresponds to an active-sensing action, to determine a risk cost that corresponds to the active-sensing action, and, based on both (i) the information-improvement expectation for the active-sensing action and (ii) the risk cost for the active-sensing action, to determine whether the active-sensing action is advisable.

It should be understood that an autonomous vehicle may be fully autonomous or partially autonomous. In a partially autonomous vehicle some functions may be manually controlled (e.g., by a person) some or all of the time. Further, a partially autonomous vehicle could be configured to switch between a fully-manual operation mode and a partially- or fully-autonomous operation mode.

The vehicle 100 could include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. That is, the engine/motor 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber, and/or other materials or combination of materials.

The sensor system 104 may include a number of sensors configured to sense information about an environment of the vehicle 100. For example, the sensor system 104 could include a Global Positioning System (GPS) 122, an inertial measurement unit (IMU) 124, a RADAR unit 126, a laser rangefinder/LIDAR unit 128, at least one camera 130, and/or at least one microphone 131. The sensor system 104 could also include sensors configured to monitor internal systems of the vehicle 100 (e.g., $O_2$ monitor, fuel gauge, engine oil temperature). Other sensors are possible as well.

One or more of the sensors included in sensor system 104 could be configured to be actuated separately and/or collectively in order to modify a position and/or an orientation of the one or more sensors.

The GPS 122 may be any sensor configured to estimate a geographic location of the vehicle 100. To this end, GPS 122 could include a transceiver operable to provide information regarding the position of the vehicle 100 with respect to the Earth.

The IMU 124 could include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 could include one or more devices configured to capture a plurality of images of the environment of the vehicle 100. The camera 130 could be a still camera or a video camera. In some embodiments, the camera 130 may be mechanically movable such as by rotating and/or tilting a platform to which the camera is mounted. As such, a control process of vehicle 100 may be implemented to control the movement of camera 130.

The sensor system 104 may also include a microphone 131. The microphone 131 may be configured to capture sound in the environment of vehicle 100. Further, in some implementations, a vehicle 100 may include multiple be configured to capture sound from the environment of vehicle 100. In some cases, multiple microphones may be arranged as a microphone array, or possibly as multiple microphone arrays.

The control system 106 may be configured to control operation of the vehicle 100 and its components. Accordingly, the control system 106 could include various elements include steering unit 132, throttle 134, brake unit 136, a sensor fusion algorithm 138, a computer vision system 140, a navigation/pathing system 142, and an obstacle avoidance system 144.

The steering unit 132 could represent any combination of mechanisms that may be operable to adjust the heading of vehicle 100.

The throttle 134 could be configured to control, for instance, the operating speed of the engine/motor 118 and, in turn, control the speed of the vehicle 100.

The brake unit 136 could include any combination of mechanisms configured to decelerate the vehicle 100. The brake unit 136 could use friction to slow the wheels/tires 121. In other embodiments, the brake unit 136 could convert the kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 could include, for instance, a Kalman filter, Bayesian network, or other algorithm. The sensor fusion algorithm 138 could further provide various assessments based on the data from sensor system 104. Depending upon the embodiment, the assessments could include evaluations of individual objects and/or features in the environment of vehicle 100, evaluation of a particular situation, and/or evaluate possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, and obstacles. The computer vision system 140 could use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 could represent a control system configured to identify, evaluate, and avoid or otherwise negotiate potential obstacles in the environment of the vehicle 100.

The control system 106 may additionally or alternatively include components other than those shown and described.

Peripherals 108 may be configured to allow interaction between the vehicle 100 and external sensors, other vehicles, other computer systems, and/or a user. For example, peripherals 108 could include a wireless communication system 146, a touchscreen 148, a microphone 150, and/or a speaker 152.

In an example embodiment, the peripherals 108 could provide, for instance, means for a user of the vehicle 100 to interact with the user interface 116. To this end, the touchscreen 148 could provide information to a user of vehicle 100. The user interface 116 could also be operable to accept input from the user via the touchscreen 148. The touchscreen 148 may be configured to sense at least one of a position and a movement of a user's finger via capacitive sensing, resistance sensing, or a surface acoustic wave process, among other possibilities. The touchscreen 148 may be capable of sensing finger movement in a direction parallel or planar to the touchscreen surface, in a direction normal to the touchscreen surface, or both, and may also be capable of sensing a level of pressure applied to the touchscreen surface. The touchscreen 148 may be formed of one or more translucent or transparent insulating layers and one or more translucent or transparent conducting layers. The touchscreen 148 may take other forms as well.

In other instances, the peripherals 108 may provide means for the vehicle 100 to communicate with devices within its environment. The microphone 150 may be configured to receive audio (e.g., a voice command or other audio input) from a user of the vehicle 100. Similarly, the speakers 152 may be configured to output audio to the user of the vehicle 100.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In some embodiments, one or more banks of such batteries could be configured to provide electrical power. Other power supply materials and configurations are possible. In some embodiments, the power supply 110 and energy source 119 could be implemented together, as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the control system 106 in order to control the steering unit 132 to avoid an obstacle detected by the sensor system 104 and the obstacle avoidance system 144. Depending upon the embodiment, the computer system 112 could be operable to provide control over many aspects of the vehicle 100 and its subsystems.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The environment could include other vehicles, traffic lights, traffic signs, road markers, pedestrians, etc. The computer vision system 140 could recognize the various aspects of the environment based on object recognition models stored in data storage 114, or by using other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
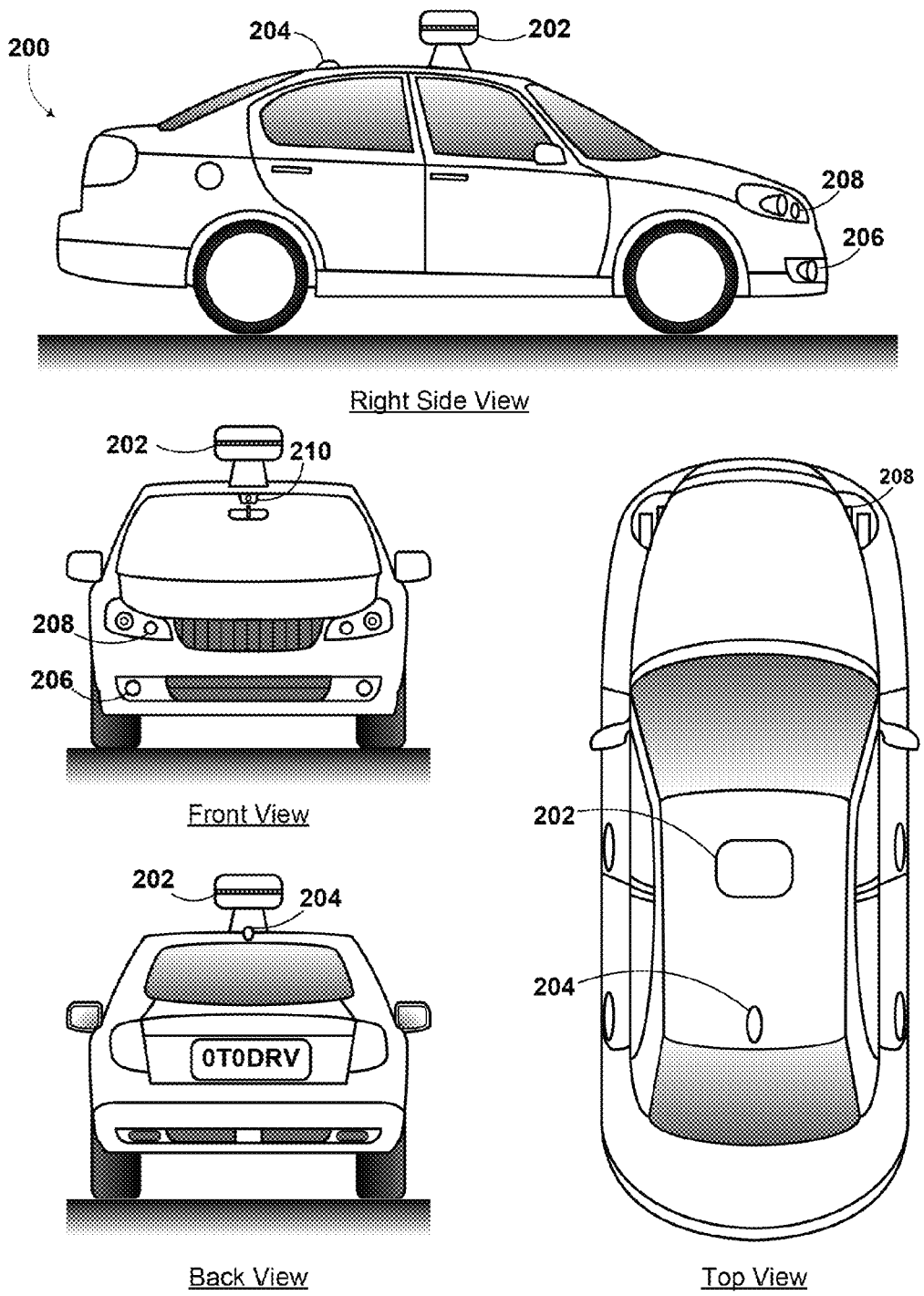
FIG. 2 shows a vehicle, according to an example embodiment.

FIG. 2 shows a vehicle 200 that could be similar or identical to vehicle 100 described in reference to FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

Depending on the embodiment, vehicle 200 could include a sensor unit 202, a wireless communication system 204, a LIDAR unit 206, a laser rangefinder unit 208, and a camera 210. The elements of vehicle 200 could include some or all of the elements described for FIG. 1.

The sensor unit 202 could include one or more different sensors configured to capture information about an environment of the vehicle 200. For example, sensor unit 202 could include any combination of cameras, RADARs, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR unit 206 and laser rangefinder unit 208. Furthermore, each sensor of sensor unit 202 could be configured to be moved or scanned independently of other sensors of sensor unit 202.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be any camera (e.g., a still camera, a video camera, etc.) configured to capture a plurality of images of the environment of the vehicle 200. To this end, the camera 210 may be configured to detect visible light, or may be configured to detect light from other portions of the spectrum, such as infrared or ultraviolet light. Other types of cameras are possible as well.

The camera 210 may be a two-dimensional detector, or may have a three-dimensional spatial range. In some embodiments, the camera 210 may be, for example, a range detector configured to generate a two-dimensional image indicating a distance from the camera 210 to a number of points in the environment. To this end, the camera 210 may use one or more range detecting techniques.

For example, the camera 210 may use a structured light technique in which the vehicle 200 illuminates an object in the environment with a predetermined light pattern, such as a grid or checkerboard pattern and uses the camera 210 to detect a reflection of the predetermined light pattern off the object. Based on distortions in the reflected light pattern, the vehicle 200 may determine the distance to the points on the object. The predetermined light pattern may comprise infrared light, or light of another wavelength.

As another example, the camera 210 may use a laser scanning technique in which the vehicle 200 emits a laser and scans across a number of points on an object in the environment. While scanning the object, the vehicle 200 uses the camera 210 to detect a reflection of the laser off the object for each point. Based on a length of time it takes the laser to reflect off the object at each point, the vehicle 200 may determine the distance to the points on the object.

As yet another example, the camera 210 may use a time-of-flight technique in which the vehicle 200 emits a light pulse and uses the camera 210 to detect a reflection of the light pulse off an object at a number of points on the object. In particular, the camera 210 may include a number of pixels, and each pixel may detect the reflection of the light pulse from a point on the object. Based on a length of time it takes the light pulse to reflect off the object at each point, the vehicle 200 may determine the distance to the points on the object. The light pulse may be a laser pulse. Other range detecting techniques are possible as well, including stereo triangulation, sheet-of-light triangulation, interferometry, and coded aperture techniques, among others. The camera 210 may take other forms as well.

The camera 210 could be mounted inside a front windshield of the vehicle 200. Specifically, as illustrated, the camera 210 could capture images from a forward-looking view with respect to the vehicle 200. Other mounting locations and viewing angles of camera 210 are possible, either inside or outside the vehicle 200.

The camera 210 could have associated optics that could be operable to provide an adjustable field of view. Further, the camera 210 could be mounted to vehicle 200 with a movable mount that could be operable to vary a pointing angle of the camera 210.

Figure 3:
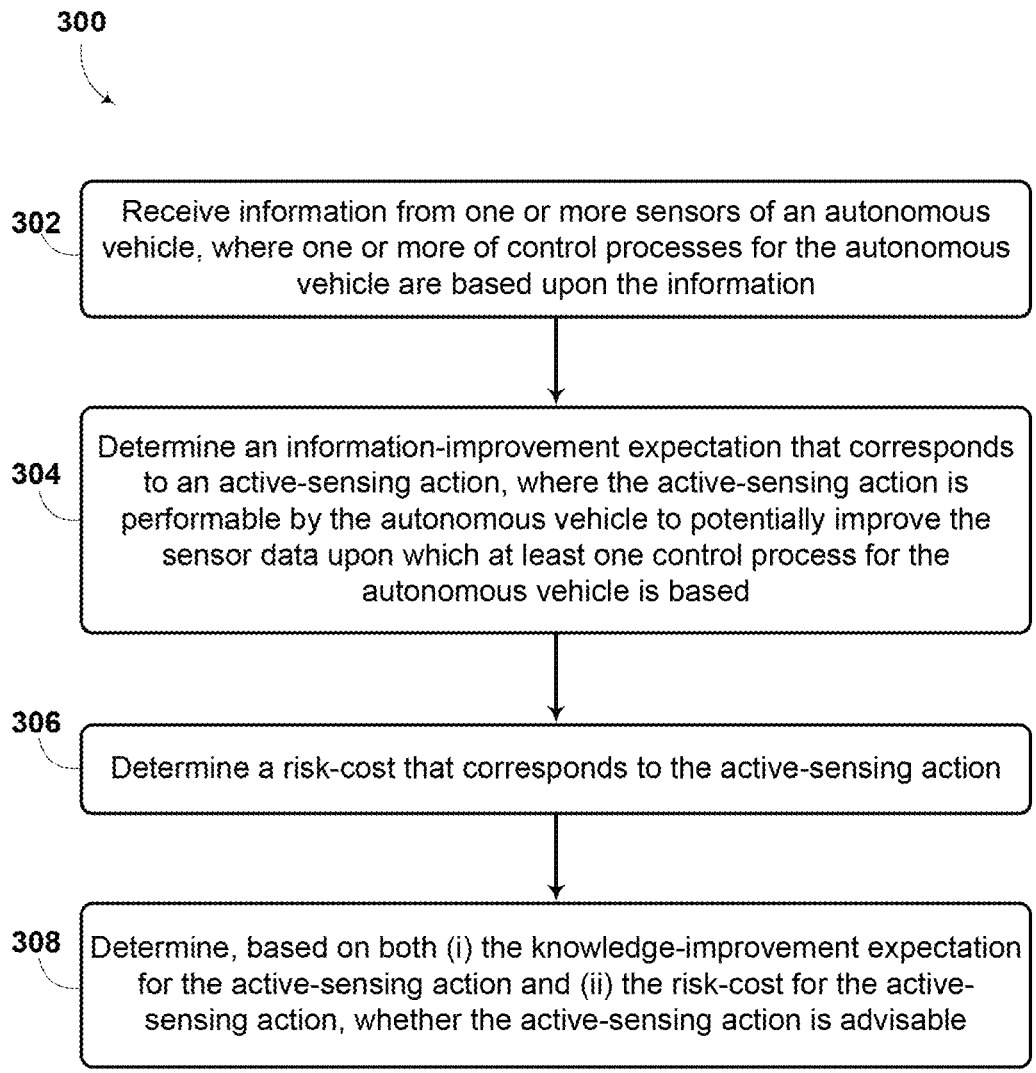
FIG. 3 is a simplified flow chart illustrating a method, according to an example embodiment.

FIG. 3 is a flow chart illustrating a method 300, according to an embodiment. Method 300 is described by way of example as being carried out by an autonomous vehicle. In particular, method 300 may be carried out by a system or subsystem of an autonomous vehicle, such as any of the features of vehicle shown in FIGS. 1 and 2 and described above. However, other systems and configurations could be used. Further, while FIG. 3 illustrates functions in an example method, it should be understood that in other embodiments, functions may appear in different order, may be added, and/or may be subtracted.

As shown by block 302, method 300 involves an autonomous vehicle receiving information from one or more sensors of an autonomous vehicle, where one or more of control processes for the autonomous vehicle are based upon the information. The autonomous vehicle then determines an information-improvement expectation that corresponds to an active-sensing action, where the active-sensing action is performable by the autonomous vehicle to potentially improve the information upon which at least one control process for the autonomous vehicle is based, as shown by block 304. The autonomous vehicle also determines a risk cost that corresponds to the active-sensing action, as shown by block 306. The autonomous vehicle may then determine, based on both (i) the information-improvement expectation for the active-sensing action and (ii) the risk cost for the active-sensing action, whether the active-sensing action is advisable, as shown by block 308. Further, in some embodiments, method 300 may involve the autonomous vehicle initiating and/or performing the active-sensing action.

Note that information may be received from sensors in various ways. In some cases, the raw sensor data itself may provide information upon which a control process is based. In other cases, control processes may be based on information that is learned or derived from analysis and/or processing of sensor data. The information that is received from a sensor may take other forms as well.

Method 300 may be implemented to determine whether various types of active-sensing actions are advisable. As an example, method 300 may be implemented to evaluate a movement of the autonomous vehicle from a first lane to a second lane that is taken in an effort to acquire more information via the sensors of the autonomous vehicle. For instance, an autonomous vehicle could apply method 300 to evaluate whether to move from the middle lane on the highway to a passing lane, or whether to move from the right-hand lane to a left-hand lane on a two-lane expressway. Other examples of lane-switching active-sensing actions are possible as well. Further, an active-sensing action might involve changing position within a lane to, e.g., be closer to one edge of the lane or closer to a curb.

Method 300 could also be implemented to evaluate an active-sensing action that involves a change in speed of the autonomous vehicle. For example, an autonomous vehicle could determine whether it is advisable for it to speed up or slow down.

Further, method 300 could be implemented to evaluate an active-sensing action that involves a change in position of the autonomous vehicle relative to an aspect of an environment of the autonomous vehicle. For instance, an active-sensing action might involve speeding up to pass and/or pull in front of another vehicle on the road. As another example, an active-sensing action might involve changing lanes to get a better view of a traffic light. Many other examples are possible.

Yet further, method 300 could be implemented to evaluate an active-sensing action that involves a change in position of at least one of the sensors that provides information for at least one control process. For example, if an autonomous vehicle includes a camera or another sensor that mechanically moveable, an active-sensing action could involve moving the camera to change the camera's field of view. Other examples of moving a camera and/or other sensors are possible.

Additionally or alternatively, method 300 could be implemented to evaluate an active-sensing action that involves a change in operation of at least one of the sensors that provides the sensor data for the at least one control process. For example, an active-sensing action may involve causing a camera to zoom in on an aspect of the environment in an effort to acquire more information about the aspect.

Further, in some implementations, an active-sensing may involve a change to the processing of sensor data from at least one sensor. As examples, the autonomous vehicle may apply a different filter to sensor data, or adjust a parameter that affects the manner in which sensor data is analyzed or evaluated. Other examples are also possible.

Furthermore, it should be understood that an active-sensing action may involve a single action or a combination of multiple actions. For example, in order to acquire more information about an aspect of its environment, an autonomous vehicle might simply change lanes. However, an active sensing action could also involve the autonomous vehicle changing lanes, moving forward a certain distance, and rotating a camera towards an aspect of its environment. Many other examples of active-sensing actions involving a single action and combinations of multiple actions are possible.

It should be understood that the above-described examples of active-sensing actions are not intended to be limiting. A method, such as method 300, may be used to evaluate any active-sensing action that is performable to potentially improve information upon which at least one control process for an autonomous vehicle is based.

At block 304 of method 300, the information-improvement expectation may be indicative of an expected improvement to the control process, if the active-sensing action is taken. In particular, the information-improvement expectation may indicate an expected improvement to the information provided by sensor data, for purposes of one or more control processes, as a result of the autonomous vehicle performing the active-sensing action.

To provide an example, an information-improvement expectation for a given active-sensing action may quantify an improvement to the information that images from a camera can provide about the environment, which in turn is expected to improve a control process. For example, if an autonomous vehicle is driving side-by-side with another vehicle for some period of time, its camera's view of the side of the road may have been obstructed, and the autonomous vehicle may not have detected a speed-limit sign for some period. As such, the autonomous vehicle may determine an information-improvement expectation that numerically represents the information it expects to gain (e.g., knowledge of the speed limit) if it speeds up or slows down so the other vehicle is no longer between it and the side of the road.

For example, consider a scenario where improvement of one or more location-based control processes is expected if a better GPS signal can be obtained. In this scenario, an information-improvement expectation may quantify the expected improvement to the location-based control processes from an active-sensing action that is expected to provide a clearer view of a satellite, such that a better GPS signal can be received. Many other types of information gains, for purposes of many types of control processes, may also be captured in an information-improvement expectation.

At block 304, various techniques may be used to determine the information-improvement expectation. For example, the autonomous vehicle may determine an information value provided by sensor data in a first state of the autonomous vehicle (e.g., its current state), as well as an expected information value that is expected to be provided by sensor data in a second state of the autonomous vehicle (e.g., the state that is expected if the autonomous vehicle were to perform the active-sensing action.) The autonomous vehicle can then subtract the information value from the expected information value to determine the information-improvement expectation.

In some implementations, there may be multiple improvements that could potentially result from the active-sensing action. Accordingly, the information-improvement expectation for the active-sensing action may account for some or all of the potential improvements.

For example, the autonomous vehicle may determine an information-improvement value for each improvement to the information upon which the at least one of the control process is based. To do so, the autonomous vehicle may determine an information value that is associated with a first state of the autonomous vehicle (e.g., its current state), as well as an expected information value that is associated with a second state of the autonomous vehicle (e.g., the state that is expected if the autonomous vehicle were to perform the active-sensing action.) The autonomous vehicle can then subtract the information value from the expected information value to determine the information-improvement value.

In addition, the autonomous vehicle may determine the probability of each improvement occurring as a result of the autonomous vehicle performing the active-sensing action. Then, for each improvement, autonomous vehicle can then multiply the information value of the improvement by the probability of the improvement occurring to determine an expected information value for the improvement. Further, in the scenario where there are multiple potential improvements as a result of an active-sensing action, the autonomous vehicle may determine the information-improvement expectation for the active-sensing action by summing the expected information values for some or all of the potential improvements.

At block 306, various techniques may be used to determine the risk cost that corresponds to the active-sensing action. In an example embodiment, the autonomous vehicle may evaluate the individual risk costs, or the risk penalties, for various bad events that might occur as the result of performing an active-sensing action. In particular, the risk penalty for a given bad event may be determined based on the probability of the bad event occurring and the risk magnitude of the bad event (e.g., a numerical representation of the bad event's severity).

Various bad events may be considered when determining the risk cost for an active-sensing action. For example, bad events may include various types of accidents, such as an accident with another vehicle, an accident with a police car or ambulance (for which the risk magnitude may be greater than it is for accidents with other vehicles), and/or an accident involving a pedestrian, among other possibilities.

Further, bad events are not limited to accidents, and may include any event that could be perceived as negative in some way. For instance, an autonomous vehicle may consider the dislike of an active-sensing action by a passenger in an autonomous vehicle to be a bad event (e.g., if an active-sensing action results in the autonomous vehicle repeatedly switching back and forth between lanes, or suddenly accelerating or coming to a stop). Similarly, the dislike or annoyance of passengers in other vehicles due to an active-sensing action may be considered a bad event, which may be taken into account when determining the risk cost for the active-sensing action.

Yet further, if an active-sensing action could make a future action more difficult, such as a planned turn or exit from a highway, this may be classified as a bad event for the active-sensing action. Possible future actions of other vehicle that are responsive to an active-sensing action, and are considered undesirable, can also be classified as bad events associated with the active-sensing action.

Even further, while an active-sensing action may often be taken in order to gain information from sensor data, other information from sensor data may be lost in the process. Accordingly, the expected degradation to a control process corresponding to information lost as the result of an active-sensing action, may also be considered a bad event.

In some implementations, the time it takes to evaluate an active-sensing action may be considered a bad event. In particular, a risk penalty may be calculated for the processing time it takes to determine and weight the information-improvement expectation and/or the risk cost. Other types of bad events are also possible as well.

To calculate the risk penalty for a given bad event, the autonomous vehicle may determine a probability of the bad event occurring as a result of the autonomous vehicle performing the active-sensing action. The autonomous vehicle may also determine a risk magnitude that corresponds to a severity of the bad event, if it does in fact occur. The autonomous vehicle can then use the respective probabilities and the respective risk magnitudes for the bad events to determine the respective risk penalties for the bad events. The autonomous vehicle may then sum the risk penalties of the potential bad events to determine the risk cost for the active-sensing action. Other techniques for determining the risk cost of performing an active-sensing action are possible as well.

Note that in some implementations, risk cost could be determined in absolute manner; e.g., by quantifying risks in the vehicle state that is expected to result from the active sensing action. For example, could simply add up the risk-contributions of the various bad events that are evaluated.

In other implementations, the risk cost could be evaluated relative to a current state of an autonomous vehicle. As such, the autonomous vehicle may determine the risk cost associated with a second (e.g., expected) state that is expected to result from the active sensing action, as well as the risk cost associated with the current state of the autonomous vehicle. The risk cost for the active-sensing action may then be calculated by subtracting the risk cost for the expected state from the risk cost for the current state.

At block 308, the autonomous vehicle may use various techniques to determine whether an active-sensing action is advisable. In an example embodiment, the information-improvement expectation and the risk cost may be determined in the same unit of measure. However, it should be understood that the information-improvement expectation and the risk cost may be determined in different units of measure, without departing from the scope of the invention.

In some implementations, the autonomous vehicle may determine a score for the active-sensing action. The score may be based on both (i) the information-improvement expectation and (ii) the risk cost. For example, the autonomous vehicle may determine the score for an active-sensing action by subtracting the risk cost for the active-sensing action from the information-improvement expectation for the active-sensing action.

Once the autonomous vehicle has determined the score, various techniques may be used to determine whether the score is indicative of an advisable active-sensing action. For example, the autonomous vehicle may determine that an active-sensing action is advisable when its score is above a threshold. Other techniques for determining whether active-sensing action is advisable are also possible.

For instance, an example method may be used to concurrently evaluate a number of possible active-sensing actions. In such an embodiment, the autonomous vehicle may evaluate a number of active-sensing actions and select a single action that is advisable. To do so, the autonomous vehicle may evaluate information-improvement expectations and risk cost in the expected vehicle state corresponding to each possible active-sensing action. The autonomous vehicle may then determine a score for each active-sensing action by subtracting the respective risk cost from the respective information-improvement expectation. The autonomous vehicle could then perform the top-scoring active-sensing action (perhaps requiring some threshold score in order to do so).

In some implementations, the autonomous vehicle could determine that multiple active-sensing actions are advisable. To do so, the autonomous vehicle could determine a score for each possible active-sensing action as described above, and then classify active-sensing actions having greater than a threshold score as advisable. Alternatively, the autonomous vehicle could rank the possible active-sensing actions according to their scores. The autonomous vehicle could then determine a certain number of the highest-ranking active-sensing actions to be advisable and/or could perform these active-sensing actions.

In a further aspect, an autonomous vehicle may implement method 100 in a periodic or continual manner. This may be beneficial since an autonomous vehicle's state may change continually, as it moves or takes other actions, and/or as its environment changes. These changes in the vehicle state and/or to environment typically may result in change to the active-sensing actions that are possible, change to the information-improvement expectation for a given active-sensing action, and/or change to the risk cost for a given active-sensing action. Thus, by implementing method 100 periodically or continually for a number of potential active-sensing actions, the autonomous vehicle may be able to periodically or continually update the active-sensing actions that are possible in its current state and environment, and weigh the knowledge improvement from the possible active-sensing actions against the risk costs associated with those active-sensing actions.

Figure 4:
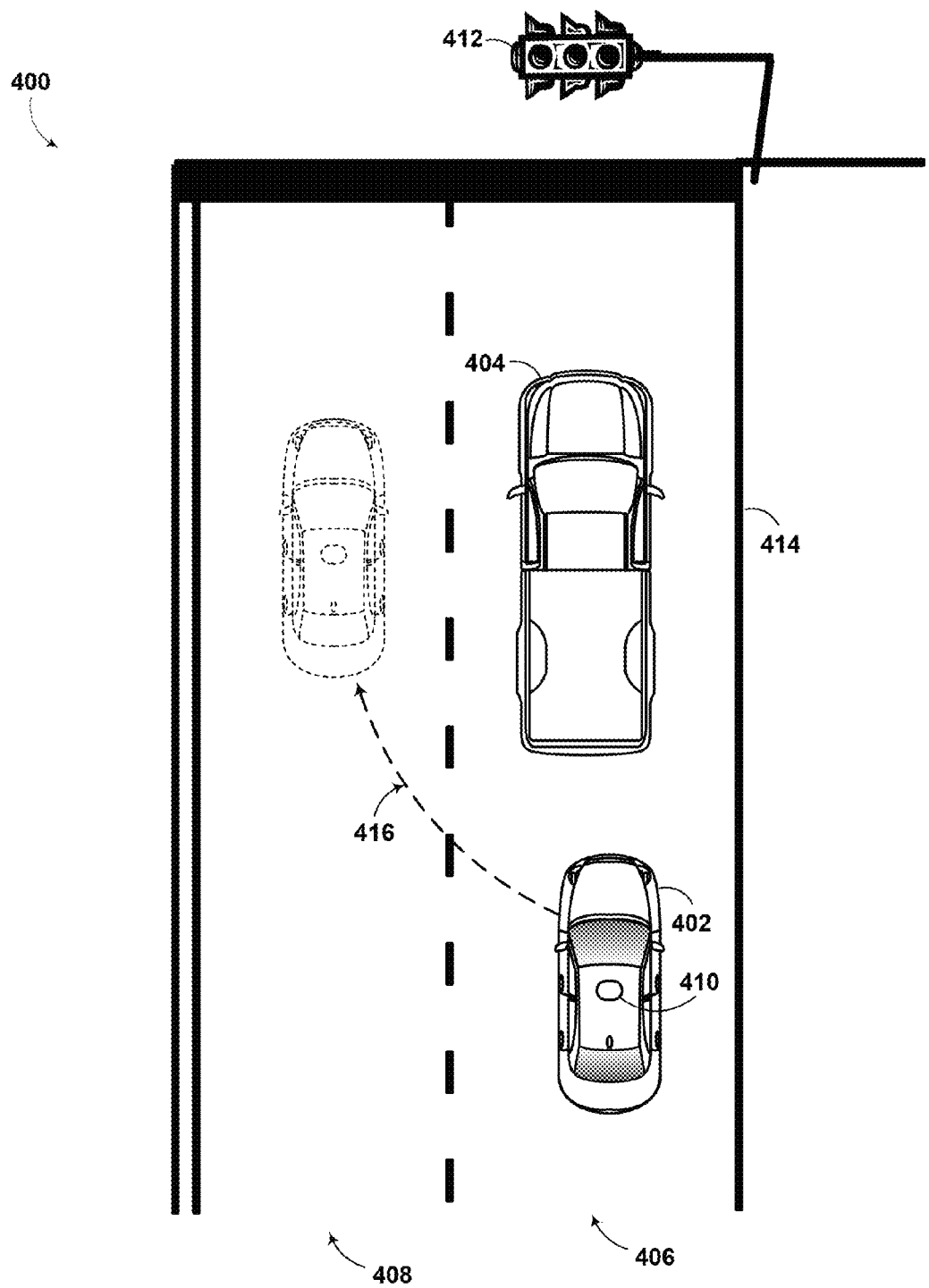
FIG. 4 is a top-down view of an autonomous vehicle operating scenario, according to an example embodiment.

FIG. 4 is a top-down view of an autonomous vehicle operating scenario 400, according to an example embodiment. In scenario 400, an autonomous vehicle 402 may carry out a method, such as method 300, in order to determine whether or not to perform an active-sensing action. The autonomous vehicle 402 (which may also be referred to simply as vehicle 402) may be identical or similar to vehicle 200 of FIG. 2. Alternatively, vehicle 402 may be another type of autonomous vehicle.

Scenario 400 shows the autonomous vehicle 402 and a large truck 404 on a roadway that includes two lanes in either direction. Note, however, that FIG. 4 shows only the right-hand lane 406 and the left-hand lane 408 in the direction that vehicle 402 is travelling on the roadway. FIG. 4 also shows a traffic light 412 and a curb 414.

In scenario 400, vehicle 402 has come to a stop in the right-hand lane 408 behind the large truck 404. As such, the sensor unit 410 of the vehicle 402 could be capturing sensor data based on an environment of the vehicle 402. For example, a camera could capture video and/or still images of the truck 404, the curb 414, and as well as other features in the environment so as to help the computer system of the vehicle 402 to determine the current state of the environment of the vehicle 402 (e.g., dashed and solid lane markers defining the right-hand and left-hand lanes 406 and 408). Other sensors associated with the vehicle 402 could be operable to provide the speed, heading, location, and other data such that the computer system of the vehicle 402 could determine the current state of the vehicle 402. However, in scenario 400, the large truck 404 may partially or wholly prevent the camera or cameras of sensor unit 410 from capturing image data that includes traffic light 412.

In a further aspect vehicle 402 may be configured for active sensing. Thus, for various reasons, vehicle 402 may determine that better image data of the traffic light 412 might improve its control processes. For example, various control processes may function according to the state of the traffic light 412 (e.g., red, yellow, or green). Such control processes may therefore be improved with, e.g., more complete images of traffic light 412, which allow vehicle 402 to better discern when the traffic light 412 switches between red, yellow, and green.

Since more complete images of traffic light 412 could improve one or more of its control processes, vehicle 402 may determine an active-sensing action that, if performed, could result in more complete images of traffic light 412. For instance, vehicle 402 may determine it could move into the left-hand lane 408 by e.g., moving along path 416, to the position illustrated by the dotted outline of vehicle 402, next to the large truck 404. (For purposes of this example, the movement of vehicle 402, along path 416, to the position illustrated by the dotted outline of the vehicle, may also be referred to as the active-sensing action 416.)

According to an example embodiment, vehicle 402 may then weigh the potential improvement to its knowledge of its environment and/or its control processes, against risk costs associated with taking the active sensing action. In particular, vehicle 402 may calculate an information-improvement expectation and a risk cost for switching lanes and pulling up beside large truck 404.

To calculate the information-improvement expectation, vehicle 402 may determine a value that is indicative of the expected improvement to the information provided by sensor data, for purposes of its control processes. To facilitate such calculations, vehicle 402 may include or have access to information-valuation data, which assigns certain values to certain types of information, for certain control processes.

To provide a specific example, information-valuation data may specify that, for purposes of a control process that determines when to accelerate the vehicle upon detecting a green light, knowing the state of a traffic light has a value of 100. Thus, in some cases, the information-improvement expectation may simply be set to 100. In other cases, however, vehicle 402 may account for possible uncertainty as to whether and/or by how much moving into the left-hand lane 408 will improve its knowledge of the state of traffic light 412. For example, if vehicle 402 determines that there is a 90% probability of correctly determining the state of traffic light after moving along path 416 into the left-hand lane 408, then it may weigh the value associated with gaining complete knowledge of the state of traffic light 412; e.g., by multiplying the value of 100 by the 90% probability of correctly determining the state of traffic light from the left-hand lane 408, to arrive at an information-improvement expectation of 90.

Note that the information-improvement expectation may quantify and/or be indicative of risk reduction and/or an increased probability of accomplishing a certain goal or task (e.g., driving the car to a certain location), which is expected to result from taking a certain active-sensing action. Accordingly, information-valuation data may quantify and/or be indicative of risk reduction and/or an increased probability of accomplishing the goal or task, which certain pieces of information are expected to provide. More specifically, the autonomous vehicle may be able to calculate a probability of accomplishing a certain goal or task given the processes, routines, controllers, sensors, current context, and/or currently-available information of the autonomous vehicle. Accordingly, the information-valuation data may include an incremental information value for each of a number of pieces of information, which indicates the increase to the probability of accomplishing the goal and/or the reduction to the risks associated with accomplishing the goal, which is expected to result if the piece of information is acquired.

Further, since the information-improvement expectation and the risk cost may both be indicative of change to the risk associated with accomplishing a goal and/or change to the probability of achieving a goal, both information-improvement expectation and the risk cost may be calculated in the same unit of measure. As such, the information-valuation data may include incremental information values for each of a number of pieces of information, which are also in the same unit of measure as the risk cost.

In some cases, vehicle 402 may also consider information that it already has, in its current state, when determining the information-improvement expectation for an active-sensing action. In particular, vehicle 402 may determine an information value for the state that would be expected if the active-sensing action were performed. Vehicle 402 may then calculate the information-improvement expectation by subtracting an information value for its current state from the expected information value that corresponds to the state that is expected after performing the active-sensing action.

As a specific example, in scenario 400, the traffic light 412 may only be partially obstructed by the large truck 404. Accordingly, based on its camera's partial view of traffic light 412, vehicle 402 may determine that there is a 60% probability of correctly determining the state of traffic light 412, in its current position, and a 90% probability in the state that is expected if it were to perform the active-sensing action. If information-valuation data assigns a value of 100 to complete knowledge of a traffic light's state, then vehicle 402 may determine the expected information value to be equal to 90, and its current information value to be 60. Thus, vehicle 402 may calculate an information-improvement expectation of 30 for the active-sensing action of moving into left-hand lane 408 along path 416.

In a further aspect, vehicle 402 may determine an information-improvement expectation that accounts for the possibility of active-sensing action 416 improving information for multiple control processes. To do so, an information-improvement expectation may be individually calculated with respect to each control process for which information may be improved, and the individual information-improvement expectations may be added together to determine the information-improvement expectation for the active-sensing action.

For example, vehicle 402 could also implement a control process that estimates the length of a red light, moves a camera to gather other environmental information, while the light is expected to be red, and then moves the camera back to observe the light just before it expects the light to turn green. Further, information-valuation data may specify that knowing the state of a traffic light has a value of 50 for purposes of this control process. Thus, continuing the above example where there is a 30% increase to the probability of correctly determining the state of the traffic light 412, the vehicle may calculate an information-improvement expectation of 15 for the active-sensing action, with respect to the control process that repurposes the camera during a red light. The information-improvement expectation for the active-sensing action may then be calculated to be 45 by, e.g., summing the information-improvement expectations to the two control processes.

In yet a further aspect, a vehicle 402 may consider the possibility of an active-sensing action improving the information used for a single control process in more than one way. For example, moving along path 416 might also improve the camera's ability to capture a street corner under traffic light 412, which may be useful for control processes that search for pedestrians and/or for other control processes. Accordingly, vehicle 402 may use similar techniques as described above to determine individual information-improvement expectations for the control processes that are expected to improve with better image data of the street corner. Vehicle 402 may then calculate the information-improvement expectation for the active-sensing action by adding these individual information-improvement expectations to the individual information-improvement expectations associated with the improvement in ability to determine the state of traffic light 412 (and possibly to individual information-improvement expectations associated with other information gains expected to result from the active-sensing action, as well).

To calculate the risk cost associated with the active-sensing action, vehicle 402 may determine a value that represents the chances of a bad event occurring as a result of a movement into the left-hand land 408 along path 416. In an example, vehicle 402 may determine individual risk penalties for a number of bad events that could potentially result from the active-sensing action, and calculate the risk cost for the active-sensing action by summing the individual penalties of the bad events.

To calculate the individual risk costs, vehicle 402 may determine a risk magnitude for each potential bad event, which indicates the severity of the bad event, if it were to occur. Vehicle 402 may also determine the probability of the bad event occurring as a result of the active-sensing action (e.g., during the performance of, or in the state of the vehicle that results from performing the active-sensing action).

Table 1 provides some examples of bad events that vehicle 402 may take into consideration in scenario 400, when determining whether it is advisable to move along path 416 into left-hand land 408.

TABLE 1

| Bad Event | Risk Magnitude | Probability (%) | Risk Penalty |
| --- | --- | --- | --- |
| getting hit by large truck | 5,000 | 0.01% | 0.5 |
| getting hit by an oncoming vehicle | 20,000 | 0.01 | 2 |
| getting hit from behind by vehicle (not shown) approaching in the left-hand lane 408 | 10,000 | 0.03% | 3 |
| hitting pedestrian who runs into the middle of the road | 100,000 | 0.001% | 1 |
| losing information that is provided by camera in current position | 10 | 10% | 1 |
| losing information that is provided by other sensor in current position | 2 | 25% | 0.5 |
| Interference with path planning involving right turn at traffic light 412 | 50 | 100% (if turn is planned)/0% (if no turn is planned) | 50/0 |

As shown in Table 1, vehicle 402 may consider the risk of having an accident with the large truck 404, the risk of an accident with an oncoming vehicle, and the risk of an accident with a vehicle (not shown) approaching from behind vehicle 402 in the left-hand lane 408. Since an accident with another vehicle may be considered highly undesirable, the risk magnitudes for these bad events is relatively high; e.g., ranging from 5,000 to 20,000, depending on the expected severity of the respective type of accident. However, since large truck 404 is stopped at the light, the probability of the large truck suddenly moving into the left-hand lane 408 may be relatively low; e.g., 0.01%. Similarly, the probability of an oncoming vehicle suddenly swerving into the left-hand lane 408 may be considered relatively low, e.g., 0.01%. An accident with a vehicle approaching from behind in the left-hand lane 408 may be considered more probable, although still relatively low (assuming that sensor data has not detected a vehicle approaching).

Further, as shown in Table 1, vehicle 402 may consider the risk hitting a pedestrian that runs into the street. While the probability of this occurring may be determined to be very low (e.g., 0.001%), an accident with a pedestrian may be considered very undesirable, and worse than an accident with another vehicle. Accordingly, the risk magnitude for hitting a pedestrian may be much higher than the risk magnitudes for accidents with other vehicles.

As further shown in Table 1, vehicle 402 may consider the risk of losing information that is provided by camera and/or by other sensors in current position. More specifically, while the vehicle's camera may be better positioned to capture traffic light 412 if it moves along path 416, it may be in a worse position for capturing other aspects of the vehicle's environment. Information provided by other sensors may also be less useful for various control processes, if the active-sensing action is taken. Accordingly, the risk penalty for lost information may be determined by calculating an information-reduction expectation for the active-sensing action. The information-reduction expectation, which is indicative of an expected worsening of one or more control processes due to reduced information, may be determined using similar techniques as those described for determining an information-improvement value, which correspond to control-process improvements resulting from gains in information.

Additionally, vehicle 402 may consider the risk of it becoming more difficult to carry out planned actions, if an active-sensing action is performed. For instance, as shown in Table 1, vehicle 402 may consider whether its path planning involves a right turn at traffic light 412. As indicated, this risk may be evaluated in a binary manner, as the planned path of travel either involves a right turn or does not; i.e., the probability that moving along path 416 into left-hand lane 408 will make it more difficult to make a planned right turn is either 100%, if the turn is planned, or 0%, if no turn is planned. Further, if a turn is planned, having to reroute may be considered to be fairly undesirable, and thus the risk magnitude and the risk penalty may be equal to 50.

As noted, to determine the risk cost for active-sensing action 416, the vehicle may sum the risk penalties associated with the bad events that might occur due to the active-sensing action. For example, consider the case where risk penalties are determined as shown in Table 1, and no right turn is planned at traffic light 412 (meaning that the risk penalty for interference with a planned right turn is 0). In this case, vehicle 402 may determine the risk cost for active-sensing action 416 to be equal to 8. However, if a right turn is planned at traffic light 412, then the risk cost may be determined to be 58.

In the above examples, the risk cost for active-sensing action 416 is indicative of the risk level associated with bad events that are possible in the vehicle state that is expected to result from the active sensing action and/or bad events that are possible while the active-sensing action is being performed. However, in other examples, the risk cost may indicate the difference between the risk level in the vehicle's current state and the risk level that is expected to result if the active sensing action is performed.

For example, vehicle 402 may calculate a risk cost in its current state, with it located in the right-hand lane 406 behind the large truck 404, in a similar manner as it calculated the risk cost associated its expected state as the result of active-sensing action 416 (for clarity, these risk costs may be referred to as the current risk cost and expected risk cost, respectively). Vehicle 402 may then subtract the expected risk cost from the current risk cost to determine the risk cost for the active-sensing action 416.

Note that when calculating the current risk cost, vehicle 402 may take into account some or all of the same bad events as it considers when calculating the expected risk cost. However, because different bad events are possible in the current and expected states, the current risk cost might be based on partially or entirely different bad events than the expected risk cost is based upon.

Once it has determined an information-improvement value and a risk cost for active-sensing action 416, vehicle 402 may determine whether active-sensing action 416 is advisable. For example, consider the above-described scenario where the information-improvement expectation for active-sensing action 416 is determined to be 30, and the above-described scenario where no right turn is planned at traffic light 412 and the risk cost is determined to be 8. In this case, vehicle 402 may determine the score to be equal to 22 by subtracting the risk cost from the information-improvement expectation. If the threshold for deeming an active-sensing action to be advisable is set at a score of 10, for example, then vehicle 402 may determine that active-sensing action 416 is advisable and perform active-sensing action 16 in an effort to improve its image data for traffic light 412.

Now consider the same scenario, except that now, a right turn is planned at traffic light 412. In this case, vehicle 412 may determine the risk cost for active-sensing action 416 to be 58. Thus, if the threshold score is set at 10, vehicle 412 may refrain from performing active-sensing action 416.

It should be understood that the specific implementation details described in reference to scenario 400 are provided for illustrative purposes, and should not be considered limiting. Other implementations of example methods and systems are possible, without departing from the scope of the invention.

Figure 5:
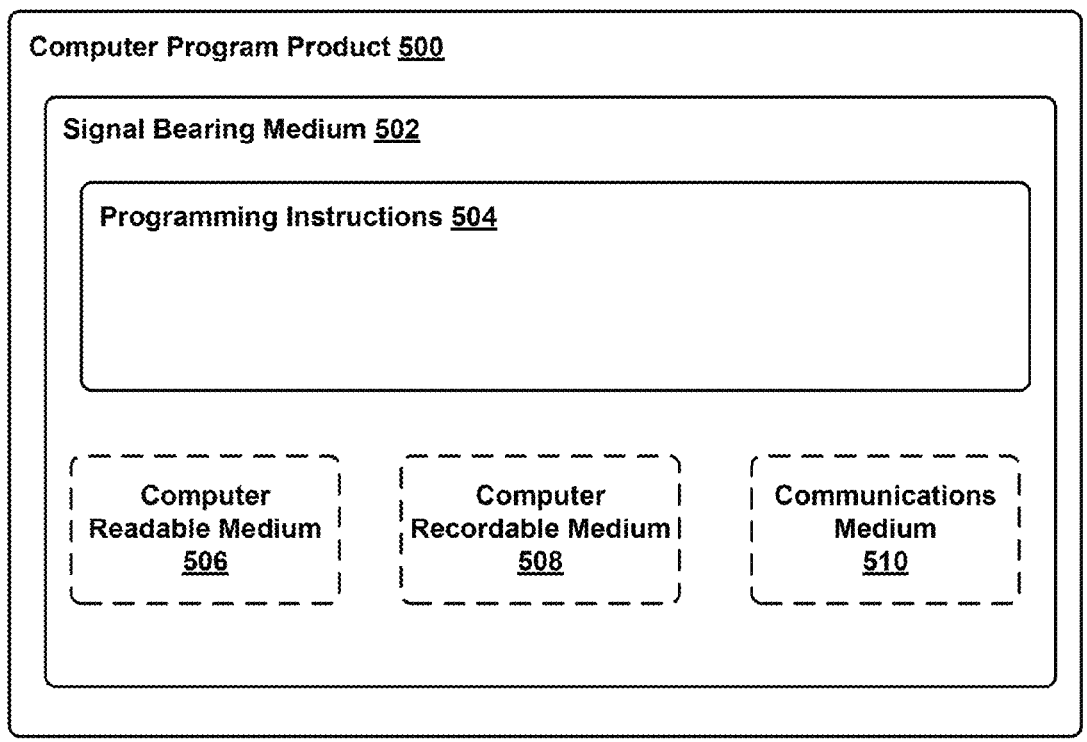
FIG. 5 is a schematic illustrating a conceptual partial view of an example computer program product that includes a computer program for executing a computer process on a computing device.

In some embodiments, the disclosed methods may be implemented by computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may encompass a computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising:
   receiving information from one or more sensors of an autonomous vehicle, wherein one or more control processes for the autonomous vehicle are based upon the information;
   determining an information-improvement expectation that corresponds to an active-sensing action, wherein the active-sensing action comprises an action that is performable by the autonomous vehicle to potentially improve the information upon which at least one of the control processes for the autonomous vehicle is based;
   determining a risk cost that corresponds to the active-sensing action; and
   based on both (i) the information-improvement expectation for the active-sensing action and (ii) the risk cost for the active-sensing action, determining whether the active-sensing action is advisable.

2. The method of claim 1, wherein the at least one sensor comprises one or more of: (a) at least one camera, (b) at least one microphone, (c) a Global Positioning System (GPS), (d) at least one accelerometer, (e) at least one gyroscope, (f) at least one compass, (g) a RADAR, (h) at least one laser rangefinder, (i) LIDAR, (j) at least one steering sensor, (k) a throttle sensor, and (l) at least one brake sensor.

3. The method of claim 1, wherein the active-sensing action comprises one or more of: (a) a movement of the autonomous vehicle from a first lane to a second lane, (b) a change in speed of the autonomous vehicle, (c) a change in position of the autonomous vehicle relative to an aspect of an environment of the autonomous vehicle, (d) a change in position of the autonomous vehicle within a lane, (e) a change in position of at least one of the sensors, (f) a change in operation of at least one of the sensors, and/or (g) a change to the processing of sensor data from at least one of the sensors, wherein the sensor data provides information upon which at least one control process is based.

4. The method of claim 1, wherein determining the information-improvement expectation that corresponds to the active-sensing action comprises:
   determining an information value of sensor data in a first state of the autonomous vehicle;
   determining an expected information value of the sensor data that is expected to be provided in a second state of the autonomous vehicle; and
   subtracting the information value from the expected information value to determine an information-improvement value for the active sensing action.

5. The method of claim 1, wherein determining the information-improvement expectation that corresponds to the active-sensing action comprises:
   (i) determining an information-improvement value of a given improvement to the information upon which the at least one of the control process is based;
   (ii) determining a probability of the given improvement occurring as a result of the autonomous vehicle performing the active-sensing action; and
   (iii) multiplying the information value of the given improvement by the probability of the given improvement occurring to determine an expected information value for the given improvement.

6. The method of claim 5, wherein the active-sensing action is expected to result in a plurality of improvements to at least one control process, and wherein determining the information-improvement expectation that corresponds to the active-sensing action comprises:
   performing (i) to (iii) for each of the plurality of improvements to determine an expected information value for each improvement; and
   determining a sum of the expected information values.

7. The method of claim 1, wherein the risk cost is indicative of a risk associated with the autonomous vehicle performing the active-sensing action.

8. The method of claim 1, wherein the risk cost is indicative of a change in risk associated with the autonomous vehicle performing the active-sensing action.

9. The method of claim 1, wherein determining the risk cost that corresponds to the active-sensing action comprises determining a risk penalty for one or more bad events that could occur as a result of the active-sensing action.

10. The method of claim 9, wherein determining the risk penalty for a given bad event comprises:
    determining a risk magnitude for the given bad event;
    determining the probability of the given bad event as a result of the active-sensing action; and
    multiplying the risk magnitude for the given bad event by the probability of the given bad event occurring to determine the risk penalty for the given bad event.

11. The method of claim 1, wherein determining the risk cost that corresponds to the active-sensing action comprises:
    determining a risk penalty for each of a plurality of bad events that could occur as a result of the active-sensing action; and
    determining a sum of the risk penalties.

12. The method of claim 1, wherein determining whether the active-sensing action is advisable comprises:
    determining a score for the active-sensing action based on both (i) the information-improvement expectation and (ii) the risk cost; and
    determining whether the active-sensing action is advisable based on the score.

13. The method of claim 12, wherein determining the score for the active-sensing action comprises subtracting the risk cost from the information-improvement expectation.

14. The method of claim 12, wherein determining whether the active-sensing action is advisable comprises determining whether the score is above a threshold.

15. The method of claim 1, further comprising:
    determining that the active-sensing action is advisable; and
    causing the autonomous vehicle to perform the active-sensing action.

16. The method of claim 1, further comprising, for each of one or more second active-sensing actions, repeating the functions of:
    determining an information-improvement expectation that corresponds to the second active-sensing action;
    determining a risk cost that corresponds to the second active-sensing action; and
    based on both (i) the information-improvement expectation for the second active-sensing action and (ii) the risk cost for the active-sensing second action, determining whether the second active-sensing action is advisable.

17. The method of claim 1:
    wherein the active-sensing action comprises a movement of the autonomous vehicle into a different lane of a road to potentially improve a representation of a traffic light in image data from a camera; and
    wherein determining the information-improvement expectation that corresponds to the active-sensing action comprises determining an expected improvement to a process that is based on a traffic-light state, wherein the expected improvement corresponds to the movement of the autonomous vehicle into the different lane of the road.

18. The method of claim 1:
wherein the active-sensing action comprises a movement of the autonomous vehicle into a different position relative to at least one other vehicle to potentially improve environmental information provided by image data from a camera; and
wherein determining the information-improvement expectation comprises determining an expected improvement to a process that is based on the environmental information, wherein the expected improvement corresponds to the movement of the autonomous vehicle into the different position relative to the at least one other vehicle.

19. The method of claim 1:
wherein the active-sensing action comprises an action by the autonomous vehicle to potentially improve a view of a GPS satellite; and
wherein determining the information-improvement expectation that corresponds to the active-sensing action comprises determining an expected improvement to a process that is based on data from a GPS signal, wherein the expected improvement corresponds to the action by the autonomous vehicle to improve the view of the GPS satellite.

20. An autonomous-vehicle system comprising:
one or more sensors;
a computer system configured to:
 use information provided by the one or more sensors for one or more control processes of an autonomous vehicle;
 determine an information-improvement expectation that corresponds to an active-sensing action, wherein the active-sensing action comprises an action that is performable by the autonomous vehicle to potentially improve the information upon which at least one of the control processes for the autonomous vehicle is based;
 determine a risk cost that corresponds to the active-sensing action; and
 based on both (i) the information-improvement expectation for the active-sensing action and (ii) the risk cost for the active-sensing action, determine whether the active-sensing action is advisable.

21. The system of claim 20, wherein, to determine the information-improvement expectation that corresponds to the active-sensing action, the computer system is configured to:
 determine an information value of sensor data in a first state of the autonomous vehicle;
 determine an expected information value of the sensor data that is expected to be provided in a second state of the autonomous vehicle; and
 subtract the information value from the expected information value to determine an information-improvement value for the active sensing action.

22. The system of claim 20, wherein, to determine the information-improvement expectation that corresponds to the active-sensing action, the computer system is configured to:
 determine an information-improvement value of a given improvement to the information upon which the at least one of the control process is based;
 determine a probability of the given improvement occurring as a result of the autonomous vehicle performing the active-sensing action; and
 multiply the information value of the given improvement by the probability of the given improvement occurring to determine an expected information value for the given improvement.

23. The system of claim 20, wherein, to determine the risk cost that corresponds to the active-sensing action, the computer system is configured to determining a risk penalty for one or more bad events that could occur as a result of the active-sensing action.

24. The system of claim 23, wherein, to determine the risk penalty for a given bad event, the computer system is configured to:
 determine a risk magnitude for the given bad event;
 determine the probability of the given bad event as a result of the active-sensing action; and
 multiply the risk magnitude for the given bad event by the probability of the given bad event occurring to determine the risk penalty for the given bad event.

25. The system of claim 20, wherein, to determine whether the active-sensing action is advisable, the computer system is configured to:
 determine a score for the active-sensing action based on both (i) the information-improvement expectation and (ii) the risk cost; and
 determine whether the active-sensing action is advisable based on the score.

26. A non-transitory computer-readable medium having program instructions stored thereon that are executable by at least one processor, the program instructions comprising:
 instructions for receiving information from one or more sensors of an autonomous vehicle, wherein one or more control processes for the autonomous vehicle are based upon the information;
 instructions for determining an information-improvement expectation that corresponds to an active-sensing action, wherein the active-sensing action comprises an action that is performable by the autonomous vehicle to potentially improve the information upon which at least one of the control processes for the autonomous vehicle is based;
 instructions for determining a risk cost that corresponds to the active-sensing action; and
 instructions for, based on both (i) the information-improvement expectation for the active-sensing action and (ii) the risk cost for the active-sensing action, determining whether the active-sensing action is advisable.

27. The non-transitory computer-readable medium of claim 26, wherein the instructions for determining the information-improvement expectation that corresponds to the active-sensing action comprise:
 instructions for determining an information value of sensor data in a first state of the autonomous vehicle;
 instructions for determining an expected information value of the sensor data that is expected to be provided in a second state of the autonomous vehicle; and
 instructions for subtracting the information value from the expected information value to determine an information-improvement value for the active sensing action.

28. The non-transitory computer-readable medium of claim 26, wherein the instructions for determining the information-improvement expectation that corresponds to the active-sensing action comprise:
 (i) instructions for determining an information-improvement value of a given improvement to the information upon which the at least one of the control process is based;

(ii) instructions for determining a probability of the given improvement occurring as a result of the autonomous vehicle performing the active-sensing action; and (iii) instructions for multiplying the information value of the given improvement by the probability of the given improvement occurring to determine an expected information value for the given improvement.

29. The non-transitory computer-readable medium of claim 26, wherein the instructions for determining the risk cost that corresponds to the active-sensing action comprise instructions for determining a risk penalty for one or more bad events that could occur as a result of the active-sensing action.

30. The non-transitory computer-readable medium of claim 29, wherein the instructions for determining the risk penalty for a given bad event comprise:

instructions for determining a risk magnitude for the given bad event;

instructions for determining the probability of the given bad event as a result of the active-sensing action; and instructions for multiplying the risk magnitude for the given bad event by the probability of the given bad event occurring to determine the risk penalty for the given bad event.

31. The non-transitory computer-readable medium of claim 26, wherein the instructions for determining whether the active-sensing action is advisable comprise:

instructions for determining a score for the active-sensing action based on both (i) the information-improvement expectation and (ii) the risk cost; and instructions for determining whether the active-sensing action is advisable based on the score.

* * * * *